United States Patent [19]

Yamatani

[11] Patent Number: 4,487,435
[45] Date of Patent: Dec. 11, 1984

[54] SWIVEL JOINT

[76] Inventor: Yoshiichi Yamatani, 1870, Manazuru-machi, Ashigarashimogun, Kanagawa-ken, Japan

[21] Appl. No.: 350,109

[22] Filed: Feb. 18, 1982

[51] Int. Cl.³ .................. F16L 21/00; F16L 17/00; F16L 27/00
[52] U.S. Cl. ......................... 285/94; 285/98; 285/106; 285/100; 285/281
[58] Field of Search ............ 285/94, DIG. 1, 95, 285/98, 106, 100, 281, 280

[56] References Cited

U.S. PATENT DOCUMENTS

| | | | |
|---|---|---|---|
| 1,977,763 | 10/1934 | Gordon | 285/94 X |
| 2,536,292 | 1/1951 | Kollsman | 285/98 X |
| 2,906,548 | 9/1959 | Faccou | 285/94 X |
| 3,306,636 | 2/1967 | Hereth | 285/94 |
| 3,746,372 | 7/1973 | Hynes et al. | 285/95 |
| 3,877,732 | 4/1975 | Mohaupt | 285/94 |
| 3,944,263 | 3/1976 | Arnold | 285/106 X |
| 4,311,327 | 1/1982 | Ortloff et al. | 284/94 X |

*Primary Examiner*—Richard J. Scanlan, Jr.
*Attorney, Agent, or Firm*—Weiser, Stapler & Kimmelman

[57] ABSTRACT

In a swivel joint which leads high-pressure liquid in a fixed pipe into a rotatable pipe coupled slidably to said fixed pipe, a lubricating chamber is provided in the neighborhood of sliding area between the fixed and rotatable pipes, and lubricant having at least same pressure as that of said high-pressure liquid is led into said lubricating chamber for smooth rotation and prevention of leakage of the high-pressure liquid and abrasion of the sldiing area.

4 Claims, 3 Drawing Figures

SWIVEL JOINT

BACKGROUND OF THE INVENTION

A water swivel joint to be used at oil well is generally oil-bath type and a simple mechanical seal is provided to prevent leakage at a sliding area between fixed and rotatable pipes. Therefore, the swivel joint is comparatively large, complete sealing is very difficult when high-pressure liquid is used and complicated and expensive maintenance is required.

OBJECTS OF THE INVENTION

Accordingly, an object of the present invention is to provide a swivel joint in which high-pressure liquid in a fixed pipe is led into a rotatable pipe coupled slidably to said fixed pipe.

Another object of the present invention is to provide a swivel joint which prevents leakage of the high-pressure liquid and maintenance is very easy.

Another object of the present invention is to provide a swivel joint which makes it easy to rotate and prevent abrasion of the sliding area between the both pipes.

Other object and advantages of the present invention will be more readily apparent from the accompanying drawing and following description.

BRIEF DESCRIPTION OF THE DRAWING

Accompanying drawing shows one embodiment in accordance with the present invention, and wherein.

DESCRIPTION OF THE PREFERRED EMBODIMENTS

Figure 3:
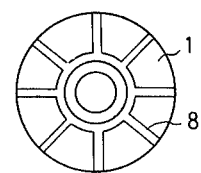
FIG. 3 is a plan of sliding area of a fixed pipe.

At one end of a fixed pipe 1 connected to a source of high-pressure liquid, a rotatable pipe 2 is slidably coupled to the fixed pipe 1 and the high-pressure liquid is supplied into the fixed pipe 1. A flange 3 is provided to the fixed pipe 1 and the sliding area is surrounded by a lubricating chamber 6 formed between inside of the flange 3 and the rotatable pipe 2 by packing 4 and holder 5. Lubricant having at least the same pressure as that of the high-pressure liquid in the fixed pipe 1 is led into the lubricating chamber 6 through a line 7. The sliding area between the fixed pipe 1 and the rotatable pipe 2 may be connected to the lubricating chamber 6 through radial and circumferential grooves 8 as shown in FIG. 3 and a certain amount of lubricant is always maintained in the sliding area.

Figure 1:
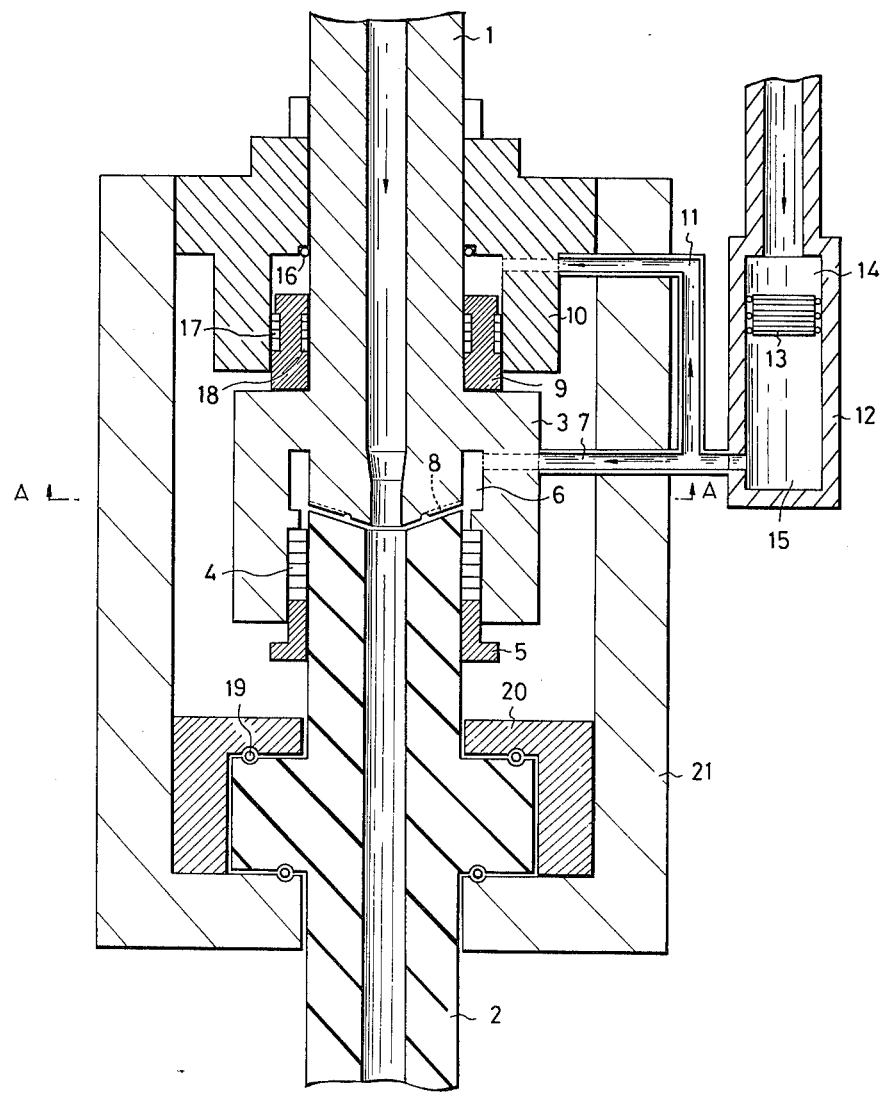
FIG. 1 is a vertical cross section of an embodiment according to the present invention, partially in section.
Figure 2:
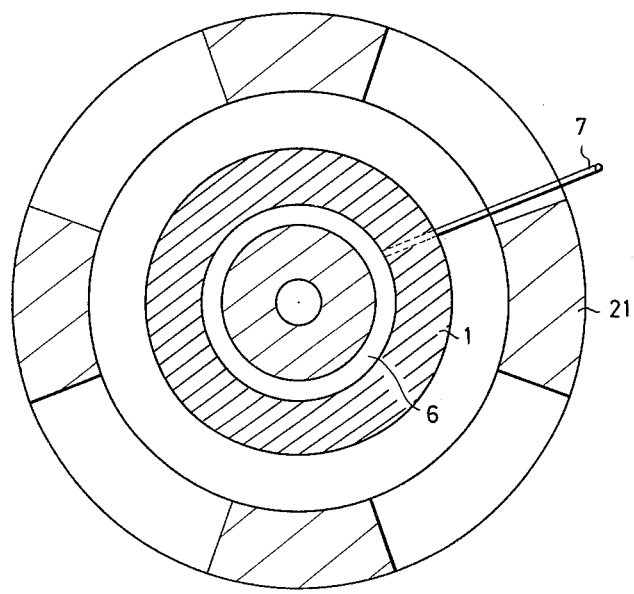
FIG. 2 is a sectional view taken on line A—A in FIG. 1.

It is desirable that a piston 9 is kept on the top of the flange 3 by a cylinder 10 and a part of the lubricant to be supplied into the lubricating chamber 6 is led to the piston 9 through a line 11 to keep the position of the fixed pipe 1, as shown in FIG. 1.

The leakage of the high-pressure liquid in pipes may be more certainly prevented when the inside diameter of the fixed pipe 1 near the sliding area is slightly smaller than that of the rotatable pipe 2 as shown FIG. 1.

The pressure of lubricant in the lubricating chamber 6 may be kept the same as that of the high-pressure liquid in the fixed pipe 1 when a lubricant reservoir 12 having a piston 13 is provided, a part of the high-pressure liquid to be supplied into the fixed pipe 1 is led to the pressure side 14 of the piston 13 and the outlet side 15 of the piston 13 is connected to the line 7. The outlet side 15 may be also connected to the line 11 as shown in FIG. 1.

In FIGS., 16 is an O-ring, 17 and 18 are packings, 19 is a ball bearing, 20 is a retainer and 21 is a supporting member.

OPERATION

The operation of the present invention is believed to be clearly apparent from the foregoing description. When the high-pressure liquid is supplied from the fixed pipe 1 to the rotatable pipe 2, lubricant having at least the same pressure as that of the high-pressure liquid is always kept in the sliding area and leakage of the high-pressure liquid through the sliding area is prevented. The lubrication of the sliding area will be possible when grooves 8 are provided on the sliding surface of the fixed pipe 1. Also, because the piston 9 is pressed by the pressure of lubricant through the line 11, constant pressure is always applied on the sliding surface of the fixed pipe 1 and the rotatable pipe 2 and a constant thickness of lubricant film is kept in the minute gap in the sliding area. Therefore, the lubricant film is not broken, the rotation of the rotatable pipe 2 is more smooth and abrasion of the sliding area is prevented. If the inside diameter of the fixed pipe 1 near the sliding area is slightly smaller, the pressure is dropped and leakage of the high-pressure liquid is more certainly prevented. Further, the lubricant pressure is the same as that of the liquid in the fixed pipe 1 when the lubricant reservoir 12 is provided and a part of the high-pressure liquid to be supplied into the fixed pipe 1 is used in compression of the lubricant in the reservoir.

While the invention has been described and shown with particular reference to the preferred embodiment, it will be apparent that variations might be possible that would fall within the scope of the present invention, which is not intended to be limited except as defined in the following claims.

I claim:

1. A swivel joint which leads high-pressure liquid in a fixed pipe into a rotatable pipe coupled slidably to the fixed pipe, comprising a sliding area being surrounded by a lubricating chamber which is provided between the inside of a flange fixed to the fixed pipe and the rotatable pipe and a line connecting between the lubricating chamber and a source of lubricant having at least the same pressure as that of the high-pressure liquid in the fixed pipe, oil grooves being provided on the surface of the fixed pipe which is slidable relative to the rotatable pipe and being connected to the lubricating chamber, and a piston being provided for pressing against the flange so as to maintain the position of the fixed pipe and a line connected to supply lubricant to the piston.

2. A swivel joint according to claim 1, wherein the inside diameter of the fixed pipe near to the sliding area is slightly smaller than the inside diameter of the rotatable pipe.

3. A swivel joint according to claim 1, wherein a lubricant reservoir in which pressure is applied by a part of the high-pressure liquid to be supplied into the fixed pipe is provided and connected to the sliding area and the piston provided on the flange.

4. A swivel joint according to claim 3, wherein a pressure side led from a part of the high-pressure liquid and an outlet side of lubricant are partitioned in the lubricant reservoir by a piston.

* * * * *